(12) United States Patent
Ma et al.

(10) Patent No.: US 9,141,491 B2
(45) Date of Patent: Sep. 22, 2015

(54) HIGHLY AVAILABLE SERVER SYSTEM BASED ON CLOUD COMPUTING

(71) Applicant: JIANGXI ELECTRIC POWER CORPORATION INFORMATION AND COMMUNICATIONS BRANCH OF STATE GRID, Nanchang (CN)

(72) Inventors: Yong Ma, Nanchang (CN); Pingping Fu, Nanchang (CN); Fan Li, Nanchang (CN); Liang Liang, Nanchang (CN); Pengfei Yu, Nanchang (CN); Wenjun Li, Nanchang (CN)

(73) Assignee: JIANGXI ELECTRIC POWER CORPORATION INFORMATION AND COMMUNICATIONS BRANCH OF STATE GRID, Jiangxi (CN)

( * ) Notice: Subject to any disclaimer, the term of this patent is extended or adjusted under 35 U.S.C. 154(b) by 141 days.

(21) Appl. No.: 13/677,103

(22) Filed: Nov. 14, 2012

(65) Prior Publication Data
US 2014/0026000 A1    Jan. 23, 2014

(30) Foreign Application Priority Data
Jul. 17, 2012 (CN) .......................... 2012 2 0346503

(51) Int. Cl.
| | |
|---|---|
| G06F 11/00 | (2006.01) |
| G06F 11/20 | (2006.01) |
| H04L 29/14 | (2006.01) |
| H04L 29/08 | (2006.01) |

(52) U.S. Cl.
CPC ........ *G06F 11/2028* (2013.01); *G06F 11/2094* (2013.01); *H04L 29/14* (2013.01); *H04L 67/10* (2013.01); *G06F 2201/815* (2013.01)

(58) Field of Classification Search
USPC ...................................................... 714/13, 25
See application file for complete search history.

(56) References Cited

U.S. PATENT DOCUMENTS

| | | | |
|---|---|---|---|
| 2009/0249284 A1* | 10/2009 | Antosz et al. ................. | 717/104 |
| 2011/0296000 A1* | 12/2011 | Ferris et al. ................... | 709/224 |
| 2012/0041889 A1* | 2/2012 | Morrison et al. ............. | 705/321 |
| 2012/0331021 A1* | 12/2012 | Lord ............................. | 707/826 |
| 2014/0040656 A1* | 2/2014 | Ho et al. .......................... | 714/3 |

* cited by examiner

*Primary Examiner* — Sarai Butler
(74) *Attorney, Agent, or Firm* — J.C. Patents

(57) ABSTRACT

A highly available server system based on cloud computing comprises a central control management server, a cloud host server, a storage server and at least one application server; the central control management server is connected with at least one application server, and configured to respectively monitor at least one application server, if detecting that there exists an application server in the fault state among the at least one applications server, then the central control management server sends a first instruction message; the cloud host server is connected with the central control management server, and configured to receive the first instruction message, and call the target virtual machine image file from the storage server according to instructions of the first instruction message, and run the target virtual machine image file; the storage server is configured to store the corresponding virtual machine image file of at least one application server.

12 Claims, 2 Drawing Sheets

HIGHLY AVAILABLE SERVER SYSTEM BASED ON CLOUD COMPUTING

CROSS-REFERENCE TO RELATED APPLICATIONS

This application claims priority to Chinese Patent Application No. 201220346503.0, filed on Jul. 17, 2012, entitled "Highly Available Server System Based on Cloud Computing", which is incorporated herein by reference in its entirety.

FIELD OF THE TECHNOLOGY

The present invention relates to computer technology, and particularly to a highly available server system based on cloud computing.

BACKGROUND

At present, in order to ensure high availability of a server system, duplicate hot-standby technology is mainly adopted. The duplicate hot-standby technology is a highly fault-tolerant application scheme combining software and hardware.

In a server system with high availability achieved using duplicate hot-standby technology, an operating system and management software are installed in a master server and a standby server, respectively, and a communication signal is transmitted to each other between the master server and the standby server according to a specific time interval so as to inform the receiving server of the current running status of the sending server. If the master server breaks down, or the standby server cannot receive the communication signal from the master server, the management software will determine that the master server is in the fault state, and stop the master server, then transfer system resources to the standby server, which will continue working in place of the master server. Thus continuous running of the server system is guaranteed, and high availability is achieved.

However, in the server system with high availability achieved using duplicate hot-standby technology, each master server needs a corresponding standby server, when the master server is running normally; the corresponding standby server is in an idle state. This will cause a waste of standby system resources and, therefore, cause low utilization efficiency of the resources in the server system.

SUMMARY

The present invention provides a highly available server system based on cloud computing, configured to improve the utilization efficiency of the system resources.

The highly available server system based on cloud computing provided by the present invention, comprising: a central control management server, a cloud host server, a storage server and at least one application server;

the central control management server is connected with the at least one application server, and configured to respectively monitor the at least one application server, if detecting that there exists an application server in the fault state among the at least one application server, then the central control management server will send a first instruction message to the cloud host server;

the cloud host server is connected with the central control management server, and configured to receive the first instruction message sent by the central control management server, and call the target virtual machine image file from the storage server according to instructions of the first instruction message, and run the target virtual machine image file; wherein the target virtual machine image file is the corresponding virtual machine image file of the application server in the fault state;

the storage server is connected with the cloud host server, and configured to store the corresponding virtual machine image file of the at least one application server, such that the cloud host server calling the target virtual machine image file in the virtual machine image files.

The central control management server is further configured to:

when detecting that the application server in the fault state has already returned to a normal state, send a second instruction message to the cloud host server;

accordingly, the cloud host server is further configured to receive the second instruction message, and stop running the target virtual machine image file according to the second instruction message.

The central control management server comprises:

a monitoring module, configured to respectively monitor the at least one application server, acquire monitoring results, and send the monitoring results to a first transceiver module;

the first transceiver module, configured to receive the monitoring results sent by the monitoring module, and when the monitoring results indicate that there exists an application server in the fault state among the at least one application server, send the first instruction message to the cloud host server;

accordingly, the cloud host server comprises:

a second transceiver module, configured to receive the first instruction message sent by the first transceiver module, and call the target virtual machine image file from the storage server according to the instruction of the first instruction message, and send the target virtual machine image file to an running module;

the running module, configured to receive the target virtual machine image file sent by the second transceiver module, and run the target virtual machine image file.

The first transceiver module is further configured to:

after the application server in the fault state has already returned to the normal state, send the second instruction message to the cloud host server;

accordingly, the second transceiver module is further configured to, receive the second instruction message sent by the first transceiver module, and send the second instruction message to the running module;

the running module is further configured to, stop running the target virtual machine image file according to the second instruction message.

There are multiple cloud host servers in the server system; accordingly, the first transceiver module is further configured to, when the monitoring results indicate there exists an application server in the fault state among the at least one application server, send the first instruction message to the cloud host server which meets the preset conditions among a plurality of cloud host servers.

The number of the cloud host servers is equal or less than the number of at least one application server.

The central control management server and the storage server are set in a same server device.

The application server is a data base server.

The present invention provided by the highly available server system based on cloud computing, through sending the first instruction message to the cloud host server after the application server in the fault state has already returned to the normal state, such that the cloud host server can call the virtual machine image file from the application server in the fault state, run the virtual machine image file by the cloud host server. When the application is in the fault state and cannot work normally, the cloud host server can continue running the application of the application server through simulating the running environment of the application server under the instruction of the central control server, and there is no need to configure a standby server for each application server, thus improving the utilization efficiency of the server system resources, and improving the efficiency and convenience of monitoring and managing each application server by the server system.

DETAILED DESCRIPTION

Figure 1:
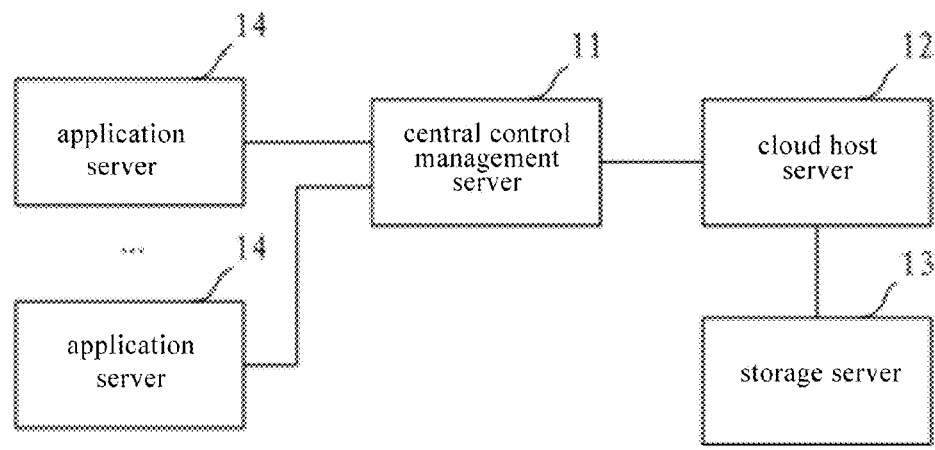
FIG. 1 is a schematic diagram of a highly available server system based on cloud computing according to an embodiment of the present invention.

FIG. 1 is a schematic diagram of a highly available server system based on cloud computing according to an embodiment of the present invention, as shown in FIG. 1, the server system comprises a central control management server 11, a cloud host server 12, a storage server 13 and at least one application server 14.

The central control management server 11 is connected with at least one application server 14 for respectively monitoring application server(s) 14 connected thereto. If the central control management server 11 detects that there exists an application server 14 in the fault state among the at least one applications server 14, then sends a first instruction message to the cloud host server 12; wherein the application server 14 can be a data base server.

The cloud host server 12 is connected with the central control management server 11, and configured to: receive a first instruction message sent by central control management server 11, call a target virtual machine image file from the storage server 13 according to the instruction of the first instruction message, and run the target virtual machine image file; wherein the target virtual machine image file is the virtual machine image file corresponding to the application server 14 in the fault state.

The storage server 13 is connected with the cloud host server 12, and configured to store the virtual machine image files respectively corresponding to the at least one application servers 14, such that the cloud host server 12 can call the target virtual machine image file of the virtual machine image file.

The server system in this embodiment of the present invention comprises a central control management server 11, a cloud host server 12, a storage server 13 and one or more application servers 14.

The central control server 11 in the server system is connected with one or more application servers 14 respectively, and is further connected with the cloud host server 12. The central control management server 11 monitors the one or more application servers connected with it, the monitoring content comprises monitoring whether there exists application server 14 in the fault state. If the central control management server detects that there exists an application server 14 in the fault state among one or more applications servers 14, then sends a first instruction message to the cloud host server 12 connected with it, the first instruction message is used to instruct the cloud host server 12 to call the virtual machine image file corresponding to the application server 14 in the fault state from the storage server 13 connected with it.

An optional implementation method is that, the central control management server 11 sends a first instruction message carrying an unique identification information which identifying the application server 14 in the fault state to the cloud host server 12 after detecting that there exists an application server 14 in the fault state among one or more application servers 14; the cloud host server 12 calls the virtual machine image file corresponding to the identification information in the storage server 13 according to the identification information carried by the first instruction message after receiving the first instruction message. It should be understood that, in this implementation method, the central control management server 11 stores the identification information of all the application servers 14 connected with it, and the virtual machine image files stored in the storage server 13 correspond to the identification information of the application servers 14, respectively, that is to say, the virtual machine image file corresponding to the identification information is the virtual machine image file of the application server 14 corresponding to the identification information.

The application server 14 which is connected with the central control management server 11 can be a data base server, or other types of servers or devices. In the embodiments of the present invention, as the central control management server 11 monitors whether there exists an application server 14 in the fault state which is connected with it, yet the specific function of the application server 14 doesn't affect the monitoring thereof by the central control management server 11, therefore, the embodiments of the present invention do not limit the functions of the application server 14.

The cloud host server 12 in the server system is connected with the central control management server 11 and the storage server 13, respectively. The central control management server 11 sends a first instruction message to the cloud host server 12 after detecting there exists an application server 14 in the fault state, accordingly the cloud host server 12 receives the first instruction message sent by the central control management server 11. Then the cloud host server 12, after receiving the first instruction message, calls the virtual machine image file corresponding to the identification information in the storage server 13 connected thereto according to the identification information carried by the first instruction message. The virtual machine image file corresponding to the application server in the fault state is the target virtual machine image file, the cloud host server 12 runs the target virtual machine image file after calling the target virtual machine image file from storage server 13.

Since the virtual machine image file is an operation file simulating the running environment of corresponding application server 14, when the cloud host server 12 runs the target virtual machine image file thereon, it is equivalent to running the environment of the application server 14 in the fault state, that is to say, when the application server 14 is in the fault state, the cloud host server 12 runs the virtual machine image file corresponding to the application server 14, that is equivalent to continuously running application in the application server 14.

An optional implementation method is that, the central control management server 11 sends a first instruction message to the cloud host server 12, carrying an identification information of the application server 14 in the fault state, such that the cloud host server 12 can call the virtual machine image file corresponding to the identification information in the storage server 13 using the identification information. Accordingly, the virtual machine image files stored in the storage server 13 correspond with the identification information of respective application servers 14.

The storage server 13 is connected with the cloud host server 12 in the server system, a virtual machine image file of respective application server 14 which is connected with the central control management server 11, is pre-stored in the storage server 13. That is to say, one or more virtual machine image files stored in the storage server 13 correspond with respective one or more application server 14. Thus the cloud host server 12 can call the virtual machine image file corresponding to the application server 14 in the fault state, i.e. the target virtual machine image file, among one or more virtual machine image files stored in the storage server 13 according to the first instruction message after receiving a first instruction message sent by the central control management server 11.

An optional implementation method is that, one or more virtual machine image files stored in the storage server 13 correspond with identification information of respective one or more application servers 14. That is to say, each virtual machine image file corresponds with the identification information of each application server 14, respectively, and each application server 14 is identified by respective identification information, and is distinguished by the identification information, thus each virtual machine image file corresponds with respective identification information of each application server 14, such that the cloud host server 12 can call the virtual machine image file corresponding to the identification information in the storage server 13 according to the identification information of the application server 14. It should be understood that, the first instruction message sent to the cloud host server 12 by the central control management server 11 carries the identification information of the application server 14 in the fault state.

When two or more application servers 14 among application servers 14 connected with the central control management server 11 are in the fault state, the central control management server 11 will send a first instruction message to the cloud host server 12, the cloud host server 12 will call the virtual machine image files of the two or more application servers in the fault state, respectively, and run each virtual machine image file.

The manner that the cloud host server 12 calls the target virtual machine image file from the storage server 13 can be that the cloud host server 12 copies the target virtual machine image file corresponding to the application server 14 in the fault state from the storage server 13.

Furthermore, the central control management server 11 monitoring the application server 14 connected with it and sending the instruction message to the cloud host server 12 can be implemented by installing agent software into the cloud host server 12 and the application server 14 in advance. The central control management server 11 monitors the application server 14 connected with it using the agent software, and the central control management server 11 sends an instruction message to the agent software, then the agent software analyzes the instruction message, thus corresponding operation is executed on the cloud host server 12. The above is only an example of the implementation method for the central control management server 11 to control the application server 14 and the cloud host server 12, applicable implementation methods are not limited to this.

Furthermore, the central control management server 11 and the storage server 13 can also be set within a same server device according to the requirement of the server system.

In the highly available server system based on cloud computing according to an embodiment of the present invention, the central control management server sends a first instruction message to the cloud host server after detecting that there exists an application server in the fault state, so that the cloud host server calls the virtual machine image file corresponding to the application server in the fault state from the storage server, and runs the virtual machine image file. Therefore, when the application server is in the fault state and cannot work properly, the cloud host server can continue running the application on the application server by simulating the same environment of the application server under control of the central control management server, without the need to allocate a stand-by server device for each application server respectively, thus improving the utilization efficiency of the server system resources, and improving the efficiency and convenience of monitoring and managing each application server by the server system.

Furthermore, on the basis of above embodiments, the central control management server 11 is further configured to send a second instruction message to the cloud host server 12 after detecting that the application server 14 in the fault state has already returned to the normal state;

accordingly, the cloud host server 12 is further configured to receive the second instruction message, and stop running the target virtual machine image file according to the second instruction message.

After detecting by the central control management server that the application server in the fault state has already returned to a normal state, the central control management server 11 sends a second instruction message to the cloud host server 12 and instructs the cloud host server 12 to stop running the virtual machine image file corresponding to the application server 14 in the fault state. After receiving the second instruction message, the cloud host server 12 stops running the target virtual machine image file, i.e., stops running the virtual machine image file corresponding to the application server 14 in the fault state and releases the corresponding system sources on the cloud host server 12 according to the received second instruction message.

When there are two or more application servers 14 returned to the normal state, the cloud host server 12 will stop running the virtual machine image files corresponding to the two or more application server 14, respectively, according to the second instruction message.

An optional implementation method is that, the second instruction message carries the identification information of the application server 14 which has already returned to the normal state, such that the cloud host server 12 will stop running the virtual machine image file corresponding to the identification information according to the second instruction message.

In the highly available server system based on cloud computing according an embodiment of the present invention, the central control management server sends a second instruction message to the cloud host server after the central control management server detects that the application server in the fault state has already returned to the normal state, so that the cloud host server stops running the target virtual machine image file. Therefore it is achieved that the cloud host server runs the application simulating the running environment of the application server during its fault state and, after the application server in the fault state has returned to the normal state, the system resources of the cloud host server will be released for running virtual machine image files corresponding to other application servers when they are in the fault state, thus improving the utilization efficiency of the server system resources.

Figure 2:
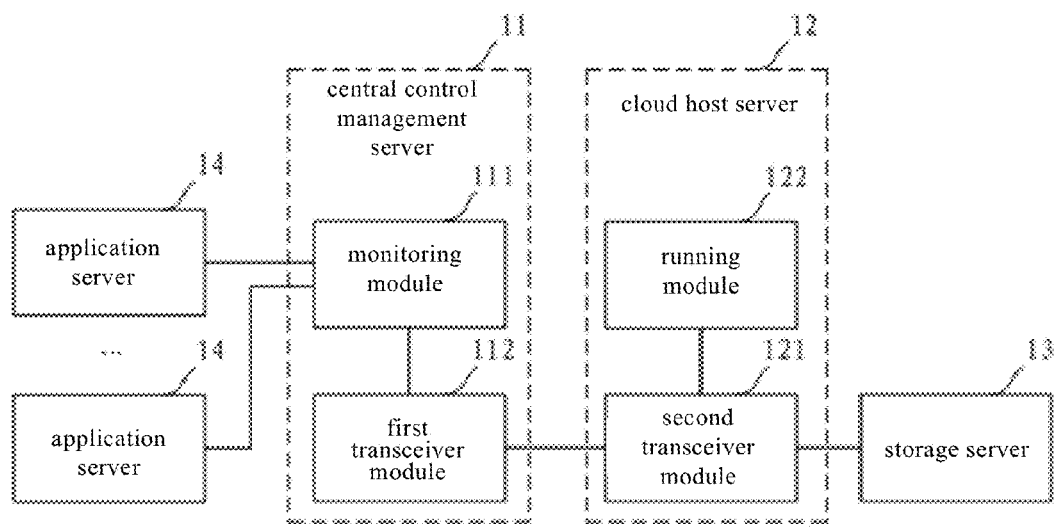
FIG. 2 is a schematic diagram of a highly available server system based on cloud computing according to another embodiment of the present invention.

FIG. 2 is a schematic diagram of the highly available server system based on cloud computing according to another embodiment of the present invention, as shown in FIG. 2, a central control management server 11 comprises a monitoring module 111 and a first transceiver module 112; the clouding host server 12 comprises a second transceiver module 121 and a running module 122. Wherein the monitoring module 111, configured to respectively monitor at least one application server 14, acquires a monitoring result, and sends the monitoring result to the first transceiver module 112; the first transceiver module 112 is configured to receive the monitoring result sent by the monitoring module 111 and, when the monitoring result indicates that there exists an application server 14 in the fault state among the at least one application servers 14, sends the first instruction message to the cloud host server 12; the second transceiver 121 is configured to receive the first instruction message sent by the first transceiver module 112, call the target virtual machine image file from the storage server 13 according to the first instruction message, and send the target virtual machine image file to the running module 122; the running module 122 is configured to receive the target virtual machine image file sent by the second transceiver 121, and run the target virtual machine image file.

The monitoring module 111 in the central control management server 11 is connected with one or more application servers 14, the monitoring module 111 monitors one or more application servers 14 connected with it, the content monitored by the monitoring module 111 regarding to the application server 14 comprises if there exists an application server 14 in the fault state. The monitoring module 111 sends the monitoring result acquired to the first transceiver module 112. If the monitoring result received by the first transceiver module 112 indicates that there exists an application server 14 in the fault state among the at least one or more application servers 14, the first transceiver module 112 sends the first instruction message to the second transceiver 121 of the cloud host server 12. The second transceiver 121 of the cloud host server 12 calls the virtual machine image file corresponding to the application server 14 in the fault state from the storage server 13 according to the first instruction message after receiving the first instruction message sent by the first transceiver 112 of the central control management server 11. The virtual machine image file corresponding to the application server 14 in the fault state is the target virtual machine image file. The second transceiver 121 sends the target virtual machine image file to the running module 122 after calling it from the storage server 13, and the running module 122 runs the target virtual machine image file.

The highly available server system based on cloud computing of the embodiments of the present invention monitors the application server through the monitoring module of the central control management server, and sends the monitoring result to the first transceiver module of the central control management server, the first transceiver module sends the first instruction message to the second transceiver module when the monitoring result indicates that there exist an application server in the fault state, such that the second transceiver module calls the virtual machine image file corresponding to the application server in the fault state from the storage server, the running module of the cloud host server continues running the applications of the application server by simulating the same environment of the application server under control of the central control management server, and without the need to allocate a server device for each application respectively, thus improving the utilization efficiency of the server system resources, and improving the efficiency and convenience of monitoring and managing each application server by the server system.

Furthermore, on the basis of above embodiments, the first transceiver module 112 is further configured to send a second instruction message after the monitoring result indicates that the application server 14 in the fault state has already returned to the normal state; accordingly, the second transceiver module 121 is further configured to receive the second instruction message sent by the first transceiver 112, and send the second instruction message to the running module 122; the running module 122 is further configured to stop running the target virtual machine image file according to the second instruction message.

When the monitoring result received by the first transceiver 112 module of the central control management server 11 indicates that the application server 14 in the fault state has already returned to the normal state, the first transceiver 112 module sends the second instruction message to the second transceiver module 121 of the cloud host server 12, the second transceiver module 121 sends the second instruction message to the running module 122 of the cloud host server 12 after receiving the second instruction message, the running module 122 stops running the target virtual machine image file, i.e. stops running the virtual machine image file corresponding to the application server 14 in the fault state after receiving the second instruction message.

When two or more application servers 14 return to the normal state, the running module 122 stops running the virtual machine image files corresponding to the two or more application servers 14 according to the second instruction message.

In the highly available server system based on cloud computing provided by embodiments of the present invention, after the monitoring module of the central control management server detects that the application server in the fault state has returned to the normal state, the first transceiver module of the central control management server sends a second instruction message to the second transceiver module of the cloud host server, so that the running module of the cloud host server stops running the target virtual machine image file. Therefore it is achieved that the cloud host server runs the application simulating the running environment of the application server during its fault state and, after the application server in the fault state has returned to the normal state, the system resources of the cloud host server will be released for running virtual machine image files corresponding to other application servers when they are in the fault state, thus improving the utilization efficiency of the server system resources.

Furthermore, on the basis of above embodiments, there can be multiple cloud host servers 12 in the server system; accordingly, the first transceiver module 112 is further configured to send the first instruction message to the cloud host servers 12 which meet a preset condition among the multiple cloud host servers 12 when the monitoring result indicates that there is an application server 14 in the fault state among the at least one application servers 14.

Figure 3:
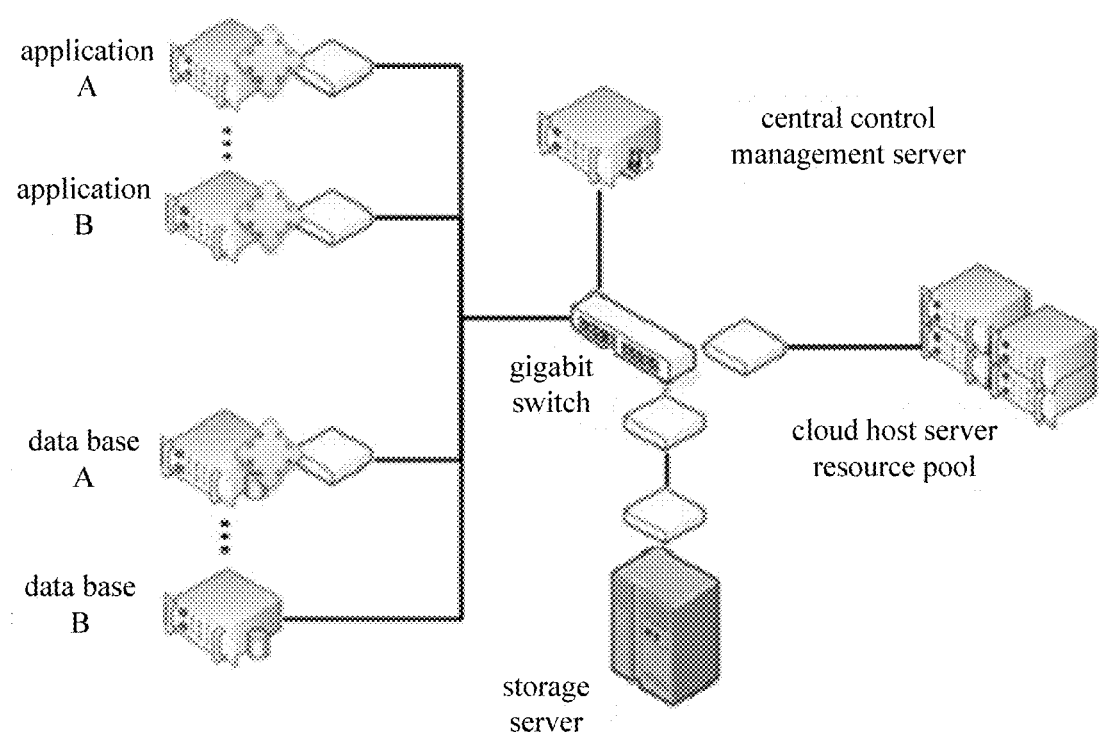
FIG. 3 is a schematic diagram of a highly available server system based on cloud computing according to still another embodiment of the present invention.

There can be multiple cloud host servers 12 in the embodiments of the present invention, i.e., multiple cloud host servers 12 form a cloud host server resource pool, as shown in FIG. 3. FIG. 3 is a schematic diagram of the highly available server system based on cloud computing according to still another embodiment of the present invention. The devices in the server system of the embodiments of the present invention connect and communicate with each other through high speed network system, i.e., gigabit switch. When the monitoring result sent by the monitoring module 111 in the central control management server 11 to the first transceiver module 112 indicates that, one or more application servers 14 which are connected to the monitoring module 111 is in the fault state, the first transceiver module 112 sends the first instruction message to the second transceiver module 121 of the cloud host servers 12 which meet the preset condition in the cloud host server resource pool.

The preset condition can be a requirement to the idle system resource for the cloud host server 12, that is to say, in the cloud host server resource pool, the cloud host servers 12 which meet the preset condition are those that can provide enough system resource for running the corresponding virtual machine image file.

Furthermore, the number of the cloud host servers 12 is equal or less than the number of the at least one application servers 14. For example, using the cloud host server resource pool formed by 5 cloud host servers 12 can achieve the backup of 20 application servers.

The highly available server system based on cloud computing provided by embodiments of the present invention sets up multiple cloud host servers as the cloud host server resource pool in the server system, such that when there are a relatively large number of application servers in the server system and one or more application servers are in the fault state, guarantees enough system resource for running the corresponding virtual machine image file, and the central control management server selects the cloud host servers which meet the preset condition in the cloud host server resource pool so as to run the corresponding virtual machine image file, thus guaranteeing the high availability of the server system, and improving the utilization efficiency of the server system resources.

Those skilled in this art can understand that: the implementation method of all or part of the steps in the above-mentioned embodiments can be conducted by a hardware related to program instructions. The program may be stored in a computer readable storage medium. During running, the program is executed, the steps of the above-mentioned method of the above embodiments are implemented. The storage medium comprises the various media which are able to store program codes such as ROM, RAM, diskette or compact disc, etc.

Finally, it should be noted that the above embodiments are merely used for illustratively describing the technical solutions of the present invention, but not intended to limit the present invention. Although the present invention has been described in detail with reference to the foregoing embodiments, it should be understood that those skilled in the art can make modifications to the technical solutions described in the foregoing embodiments or equivalent substitutions of a part of technical features or all of the technical features thereof without creative work, and these modifications or substitutions do not make the essence of their corresponding technical solutions deviate from the scope of the invention as defined in the claims.

What is claimed is:

1. A highly available server system based on cloud computing, comprising:
   a central control management server, a cloud host server, a storage server and at least one application server; wherein:
   the central control management server is connected with the at least one application server, and configured to respectively monitor the at least one application server, if detecting that there exists an application server in the fault state among the at least one application server, then the central control management server send a first instruction message to the cloud host server;
   the cloud host server is connected with the central control management server, and configured to receive the first instruction message sent by the central control management server, and call a target virtual machine image file from the storage server according to the first instruction message, and run the target virtual machine image file to simulate a running environment of corresponding application server; wherein the target virtual machine image file is a target virtual machine image file corresponding to the application server in the fault state; and
   the storage server is connected with the cloud host server, and configured to store the virtual machine image file corresponding to the at least one application server, for the cloud host server to call the target virtual machine image file of the virtual machine image file.

2. The highly available server system based on cloud computing according to claim 1, wherein the central control management server is further configured to:
   when detecting that the application server in the fault state has already returned to a normal state, send a second instruction message to the cloud host server;
   the cloud host server is further configured to receive the second instruction message, and stop running the target virtual machine image file according to the second instruction message.

3. The highly available server system based on cloud computing according to claim 1, wherein the central control management server comprises:
   a monitoring module, configured to respectively monitor the at least one application server, acquire monitoring result, and send the monitoring result to a first transceiver module;
   the first transceiver module, configured to receive the monitoring result sent by the monitoring module, and when the monitoring result indicates that there exists an application server in the fault state among the at least one application server, send the first instruction message to the cloud host server;
   the cloud host server comprises:
   a second transceiver module, configured to receive the first instruction message sent by the first transceiver module, and call the target virtual machine image file from the storage server according to the first instruction message, and send the target virtual machine image file to a running module; and
   the running module, configured to receive the target virtual machine image file sent by the second transceiver module, and run the target virtual machine image file.

4. The highly available server system based on cloud computing according to claim 2, wherein the central control management server comprises:
   a monitoring module, configured to respectively monitor the at least one application server, acquire monitoring result, and send the monitoring result to a first transceiver module;
   the first transceiver module, configured to receive the monitoring result sent by the monitoring module, and when the monitoring result indicates that there exists an application server in the fault state among the at least one application server, send the first instruction message to the cloud host server;
   the cloud host server comprises:

a second transceiver module, configured to receive the first instruction message sent by the first transceiver module, and call the target virtual machine image file from the storage server according to the first instruction message, and send the target virtual machine image file to a running module; and the running module, configured to receive the target virtual machine image file sent by the second transceiver module, and run the target virtual machine image file.

5. The highly available server system based on cloud computing according to claim 3, wherein the first transceiver module is further configured to:

after the application server in the fault state has returned to the normal state, send a second instruction message to the cloud host server;

the second transceiver module is further configured to, receive the second instruction message sent by the first transceiver module, and send the second instruction message to the running module; and the running module is further configured to stop running the target virtual machine image file according to the second instruction message.

6. The highly available server system based on cloud computing according to claim 4, wherein the first transceiver module is further configured to:

after the application server in the fault state has returned to the normal state, send a second instruction message to the cloud host server;

the second transceiver module is further configured to, receive the second instruction message sent by the first transceiver module, and send the second instruction message to the running module; and the running module is further configured to stop running the target virtual machine image file according to the second instruction message.

7. The highly available server system based on cloud computing according to claim 3, wherein there are multiple cloud host servers in the server system;

the first transceiver module is further configured to, when the monitoring result indicates that there exists an application server in the fault state among the at least one application server, send the first instruction message to the cloud host server which meets a preset condition among the multiple cloud host servers.

8. The highly available server system based on cloud computing according to claim 4, wherein there are multiple cloud host servers in the server system;

the first transceiver module is further configured to, when the monitoring result indicates that there exists an application server in the fault state among the at least one application server, send the first instruction message to the cloud host server which meets a preset condition among the multiple cloud host servers.

9. The highly available server system based on cloud computing according to claim 7, wherein the number of the cloud host servers is equal or less than the number of the at least one application server.

10. The highly available server system based on cloud computing according to claim 8, wherein the number of the cloud host servers is equal or less than the number of the at least one application server.

11. The highly available server system based on cloud computing according to claim 1, wherein the central control management server and the storage server are set in a same server device.

12. The highly available server system based on cloud computing according to claim 1, wherein the application server is a data base server.

* * * * *